United States Patent
Irifune et al.

(10) Patent No.: US 8,598,296 B2
(45) Date of Patent: Dec. 3, 2013

(54) ORGANOHYDROGENPOLYSILOXANE, MAKING METHOD, AND ADDITION-CURE SILICONE COMPOSITION

(75) Inventors: Shinji Irifune, Annaka (JP); Akinari Itagaki, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/597,964

(22) Filed: Aug. 29, 2012

(65) Prior Publication Data

US 2012/0323033 A1  Dec. 20, 2012

Related U.S. Application Data

(62) Division of application No. 12/837,885, filed on Jul. 16, 2010.

(30) Foreign Application Priority Data

Jul. 17, 2009 (JP) ................................. 2009-168785
Jul. 17, 2009 (JP) ................................. 2009-168793

(51) Int. Cl.
 *C08G 77/60* (2006.01)
(52) U.S. Cl.
 USPC ............................................ 528/35; 528/31
(58) Field of Classification Search
 USPC .................................................... 528/31, 35
 See application file for complete search history.

(56) References Cited

U.S. PATENT DOCUMENTS

| | | | |
|---|---|---|---|
| 5,866,707 A | 2/1999 | Herzig | |
| 2005/0256286 A1 | 11/2005 | Asch et al. | |
| 2006/0155089 A1 | 7/2006 | Ferenz et al. | |

FOREIGN PATENT DOCUMENTS

| | | |
|---|---|---|
| CN | 101011062 A | 8/2007 |
| DE | 197 18 470 A1 | 11/1998 |
| DE | 10 2005 001 039 A | 7/2006 |
| EP | 0 786 488 A2 | 7/1997 |
| JP | 8-176448 A | 9/1996 |
| JP | 9-208702 A | 8/1997 |
| JP | 2003-105089 A | 4/2003 |
| WO | 03/029375 A1 | 4/2003 |

OTHER PUBLICATIONS

Search Report issued Sep. 26, 2011, in European Patent Application No. 10251300.9.

*Primary Examiner* — Kuo-Liang Peng

(74) *Attorney, Agent, or Firm* — Birch, Stewart, Kolasch & Birch, LLP

(57) ABSTRACT

An organohydrogenpolysiloxane comprising at least two structural units of —$(HR^1SiO)_a$— wherein $R^1$ is a monovalent hydrocarbon group, and a is an integer of 2-50, which are connected together via a SiH-free structural unit, is a novel crosslinking agent. A silicone composition comprising an alkenyl-containing organopolysiloxane, the organohydrogen-polysiloxane, and a catalyst is curable through addition reaction, adherent to plastic substrates, and useful for coating purposes.

8 Claims, No Drawings

ORGANOHYDROGENPOLYSILOXANE, MAKING METHOD, AND ADDITION-CURE SILICONE COMPOSITION

CROSS-REFERENCE TO RELATED APPLICATION

This application is a divisional of, and claims priority under 35 U.S.C. §120 to, application Ser. No. 12/837,885, filed Jul. 16, 2010. Priority under 35 U.S.C. §119 is claimed through Ser. No. 12/837,885 to Japanese patent applications 2009-168785 and 2009-168793 filed in Japan on Jul. 17, 2009 and Jul. 17, 2009, respectively. The entire contents of the foregoing priority applications are hereby incorporated by reference.

TECHNICAL FIELD

This invention relates to an organohydrogenpolysiloxane, a method for preparing the same, and an addition-cure silicone composition useful as a coating material.

BACKGROUND ART

Addition-cure silicone compositions, when cured, have many advantages including heat resistance, weathering resistance and chemical resistance and also exhibit good properties of electric insulation, low-temperature behavior, and gas permeability. With respect to mold release, antifoaming and water repellency, they have unique properties which are not observed in other resins. Thus the silicone compositions are used in a wide variety of applications as the coating material that can take advantage of interfacial properties.

The addition-cure silicone compositions which are currently in commercial use generally contain an alkenyl-containing organopolysiloxane as a base, a SiH-containing organohydrogenpolysiloxane as a crosslinking agent, and a metal complex capable of catalyzing addition reaction as a cure catalyst. As to the organohydrogen-polysiloxane, various structures have been proposed. Regardless of whether the structure is linear or branched, those organohydrogenpolysiloxanes having a side chain consisting of polysiloxane units of the following formula (7) and/or (8):

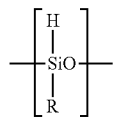

(7)

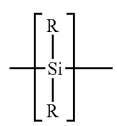

(8)

wherein R is an organic group of one or more carbon atoms are most often used. They are generally divided into two classes, organohydrogenpolysiloxanes of the homopolymer structure consisting of units of formula (7) except the terminal groups, and organohydrogenpolysiloxanes of the copolymer structure wherein basic units of formulae (7) and (8) are randomly arranged.

The two classes of organohydrogenpolysiloxanes have different characteristics. The organohydrogenpolysiloxanes of the copolymer structure are more effectively curable. On the other hand, the organohydrogenpolysiloxanes of the homopolymer structure are superior in the adhesion to substrates which is requisite for use as a coating material. Each crosslinking agent has both merits and demerits. There is a need for a crosslinking agent meeting both the functions.

Citation List

Patent Document 1: JP 3167874

SUMMARY OF INVENTION

An object of the invention is to provide an organohydrogenpolysiloxane which is useful as a crosslinking agent in addition-cure compositions, specifically addition-cure silicone compositions, and a method for preparing the same. Another object is to provide an addition-cure silicone composition which meets both adhesion and cure and is useful as a coating material on plastic and other substrates.

The inventors have found that an organohydrogenpolysiloxane in which SiH groups in block units are interspersed in the molecule and which has a silalkylene linkage in the molecule serves as a novel crosslinking agent in addition-cure compositions, and a silicone composition comprising the same is fully adherent to plastic substrates and effectively curable through addition reaction.

In one aspect, the invention provides an organohydrogenpolysiloxane comprising in the molecule at least two structural units of the following formula (1), which are connected together via a SiH-free structural unit,

(1)

wherein $R^1$ is a substituted or unsubstituted monovalent hydrocarbon group of 1 to 10 carbon atoms, and a is an integer of at least 2.

In a preferred embodiment, the organohydrogen-polysiloxane comprises recurring structural units of the formula (2):

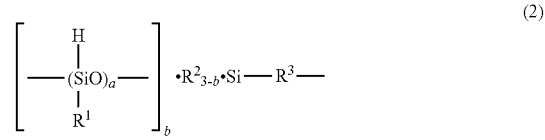

(2)

wherein $R^1$ and a are as defined above, $R^2$ is a substituted or unsubstituted monovalent hydrocarbon group of 1 to 10 carbon atoms, $R^3$ is a substituted or unsubstituted divalent hydrocarbon group of at least 2 carbon atoms, preferably a straight or branched alkylene group of 2 to 10 carbon atoms, and b is 1, 2 or 3.

In a preferred embodiment, the organohydrogen-polysiloxane is linear or branched and terminated with a $(R^2)_3SiO-$ and/or $H(R^2)_2SiO-$ group wherein $R^2$ is as defined above.

In another aspect, the invention provides a method for preparing an organohydrogenpolysiloxane, comprising the steps of effecting addition reaction between a siloxane monomer having the following general formula (3), (4), (5) or (6):

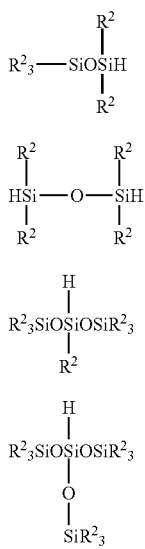

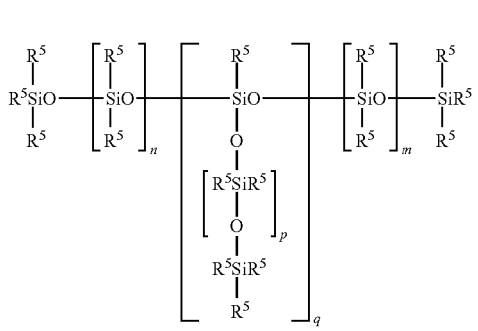

wherein R² is as defined above and a both end alkenyl-capped compound to form an adduct, and effecting acid equilibration reaction between the adduct and a SiH-containing cyclic siloxane.

In a further aspect, the invention provides an addition-cure silicone composition comprising (A) 0.1 to 100 parts by weight of the organohydrogenpolysiloxane defined above, (B) 100 parts by weight of an organopolysiloxane containing at least two alkenyl groups in the molecule, and (C) a catalytic amount of an addition reaction catalyst.

In a preferred embodiment, the alkenyl-containing organopolysiloxane has the following formula (11):

wherein $R^5$ is a substituted or unsubstituted monovalent hydrocarbon group of 1 to 10 carbon atoms or an alkenyl group of up to 8 carbon atoms, groups $R^5$ may be different, at least two $R^5$ are alkenyl, n, m, p and q are such positive numbers that the organopolysiloxane may have a viscosity of 10 to 1,000,000 mPa-s at 25° C., and $0 \leq q \leq 10$.

Typically the catalyst is a platinum group metal complex.

ADVANTAGEOUS EFFECTS OF INVENTION

When the organohydrogenpolysiloxane is used as a crosslinking agent in an addition-cure composition, the resulting silicone composition meets both the functions of tight adhesion to plastic substrates and effective cure.

DESCRIPTION OF EMBODIMENTS

Orcranohydrogenpolysiloxane

The novel crosslinking agent of the invention is an organohydrogenpolysiloxane comprising in the molecule at least two structural units of formula (1), which are connected to each other via a SiH-free structural unit.

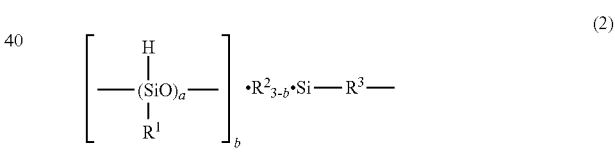

In formula (1), $R^1$ is a substituted or unsubstituted monovalent hydrocarbon group of 1 to 10 carbon atoms, examples of which include alkyl groups such as methyl, ethyl, propyl and butyl, cycloalkyl groups such as cyclohexyl, aryl groups such as phenyl and tolyl, and substituted forms of the foregoing groups in which some or all hydrogen atoms are replaced by hydroxyl, cyano or halogen, such as hydroxypropyl, cyanoethyl, 1-chloropropyl and 3,3,3-trifluoropropyl. It is preferred for curability that $R^1$ be alkyl or aryl. The subscript "a" is an integer of at least 2, preferably 2 to 50, and more preferably 3 to 30.

Preferably the organohydrogenpolysiloxane has a linear or branched structure and is terminated with a $(R^2)_3SiO-$ and/or $H(R^2)_2SiO-$ group wherein $R^2$ is a substituted or unsubstituted monovalent hydrocarbon group of 1 to 10 carbon atoms.

Also preferably the organohydrogenpolysiloxane comprises recurring structural units of formula (2).

$$\left[ -\underset{\underset{R^1}{|}}{\overset{\overset{H}{|}}{(SiO)_a}}- \right]_b \cdot R^2_{3-b} \cdot Si-R^3- \quad (2)$$

Herein $R^1$ and "a" are as defined above. $R^2$ is a substituted or unsubstituted monovalent hydrocarbon group of 1 to 10 carbon atoms, examples of which include alkyl groups such as methyl, ethyl, propyl and butyl, cycloalkyl groups such as cyclohexyl, aryl groups such as phenyl and tolyl, and substituted forms of the foregoing groups in which some or all hydrogen atoms are replaced by hydroxyl, cyano or halogen, such as hydroxypropyl, cyanoethyl, 1-chloropropyl and 3,3,3-trifluoropropyl. $R^3$ is a substituted or unsubstituted divalent hydrocarbon group of at least 2 carbon atoms, preferably a straight or branched alkylene group of 2 to 10 carbon atoms. The subscript b is 1, 2 or 3. Accordingly, formula (2) may be rewritten as the following formulae (2)-1, (2)-2 and (2)-3.

-continued (2)-2
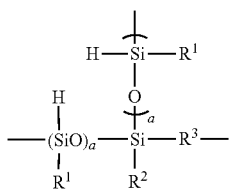

(2)-3
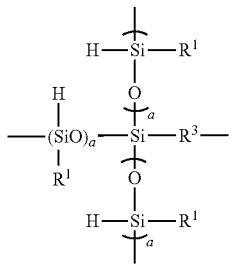

The organohydrogenpolysiloxane of the invention is useful as a crosslinking agent in addition-cure compositions which are based on alkenyl-containing polymers and rely on hydrosilylation reaction. While these compositions may use any organic polymers as the alkenyl-containing polymer, it is preferred from the standpoint of compatibility to use the organohydrogenpolysiloxane as a crosslinking agent for silicone polymers. Since the properties of the cured product vary depending on the nature of the base polymer, the organohydrogenpolysiloxane is effective in almost all applications where the cured product is used. The organohydrogenpolysiloxane is best suited for use in the coating application where the functions of cure and adhesion are expected to be advantageous.

While the amount of the organohydrogenpolysiloxane compounded in the addition-cure composition depends on the molar amount of alkenyl groups in the base polymer, it is preferably such that 0.5 to 20 moles, more preferably 0.8 to 5 moles of SiH groups from the organohydrogenpolysiloxane are available per mole of alkenyl groups from the base polymer.

Method

The method for preparing the organohydrogenpolysiloxane is not limited as long as the desired structure is maintained. Typically it is prepared by effecting addition reaction between a siloxane monomer having the following general formula (3), (4), (5) or (6):

(3)
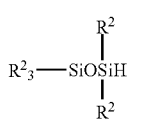

(4)
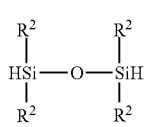

(5)
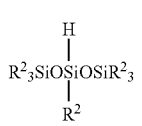

(6)
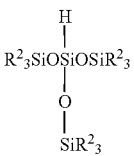

wherein $R^2$ is an optionally substituted monovalent hydrocarbon group of 1 to 10 carbon atoms and a both end alkenyl-capped compound, specifically addition reaction between SiH groups of the siloxane monomer of formula (3), (4), (5) or (6) and terminal alkenyl groups of the alkenyl-containing compound, to form an adduct, and effecting acid equilibration reaction between the adduct and a SiH-containing cyclic siloxane.

In one preferred method, a siloxane monomer having the formula (9):

(9)
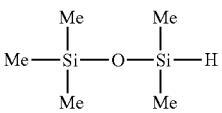

wherein Me is methyl is reacted with a both end alkenyl-capped compound to synthesize an adduct 1 having a siloxane unit and a silalkylene linkage in the molecule. Then acid equilibration reaction is effected between adduct 1 and a SiH-containing cyclic siloxane such as 1,3,5,7-tetramethylcyclotetrasiloxane, thereby introducing units of formula (1) into the siloxane moiety in adduct 1. There is obtained an organohydrogenpolysiloxane in which units of the formula:

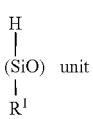

wherein $R^1$ is as defined above are incorporated as block units.

Examples of the both end alkenyl-capped compound include 1,3-butadiene, 1,3-pentadiene, 1,4-pentadiene, 1,3-hexadiene, 1,4-hexadiene, 1,5-hexadiene, 2,4-hexadiene, 1,6-heptadiene, 1,7-octadiene, 1,8-nonadiene, 1,9-decadiene, 1,3-cyclohexadiene, 1,4-cyclohexadiene, norbornadiene, and 1,3-divinyl-1,1,3,3-tetramethyldisiloxane.

Examples of the SiH-containing cyclic siloxane include those of the following formula (10):

(10)
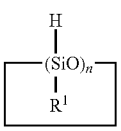

wherein $R^1$ is as defined above, and n is an integer of at least 3, preferably 3 to 10, more preferably 3 to 7, for example, 1,3,5,7-tetramethylcyclotetrasiloxane, 1,3,5,7,9-pentamethylcyclopentasiloxane, and 1,3,5,7,9,11-hexamethylcyclohexasiloxane.

In the first step, the siloxane monomer of formula (3) to (6) and the alkenyl-containing compound are preferably combined in such amounts that 0.8 to 1.2 moles of alkenyl groups from the alkenyl-containing compound may be available per mole of SiH groups from formula (3) to (6). Addition reaction may be effected by a standard technique. An addition reaction catalyst such as platinum or platinum compounds may be used in such an amount as to provide 1 to 200 ppm of platinum based on the total weight of the alkenyl-containing compound used. Reaction may run at a temperature of 30 to 150° C., preferably 50 to 120° C. The reaction time is usually 30 minutes to 24 hours.

In the second step, adduct 1 and the SiH-containing cyclic siloxane are preferably combined in such amounts that 0.1 to 50 moles of the SiH-containing cyclic siloxane is present per mole of adduct 1. Acid equilibration reaction may also be effected by a standard technique. The acid may be any of those acids commonly used in acid equilibration reaction, preferably sulfuric acid, methanesulfonic acid, and trifluoromethanesulfonic acid. The acid may be used in an amount of 0.01 to 10% by weight based on the total weight of adduct 1 and the SiH-containing cyclic siloxane. Acid equilibration reaction may run at a temperature of 5 to 100° C., preferably 20 to 70° C. The reaction time is usually 1 to 48 hours.

Composition

A further embodiment of the invention is directed to an addition-cure silicone composition comprising, as essential components, (A) the organohydrogenpolysiloxane defined above,
(B) an organopolysiloxane containing at least two alkenyl groups in the molecule, and
(C) an addition reaction catalyst.

The organohydrogenpolysiloxane as component (A) is described and exemplified above.

In the composition, the organohydrogenpolysiloxane is present in an amount of 0.1 to 100 parts, preferably 1 to 30 parts by weight relative to 100 parts by weight of the alkenyl-containing polysiloxane as component (B). Differently stated, the organohydrogenpolysiloxane is preferably compounded in such an amount that 0.8 to 3.5 moles, more preferably 1.2 to 2.5 moles of SiH groups from the organohydrogenpolysiloxane may be available per mole of alkenyl groups from the alkenyl-containing polysiloxane.

Component (B) is an organopolysiloxane containing at least two alkenyl groups in the molecule, and preferably an organopolysiloxane having the following formula (11).

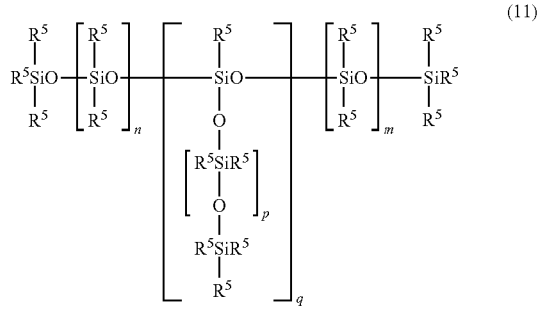

(11)

In formula (11), $R^5$ is a substituted or unsubstituted monovalent hydrocarbon group of 1 to 10 carbon atoms, examples of which include alkyl groups such as methyl, ethyl, propyl and butyl, cycloalkyl groups such as cyclohexyl, aryl groups such as phenyl and tolyl, and substituted forms of the foregoing groups in which some or all hydrogen atoms are replaced by hydroxyl, cyano or halogen, such as hydroxypropyl, cyanoethyl, 1-chloropropyl and 3,3,3-trifluoropropyl, or an alkenyl group of up to 8 carbon atoms, as represented by —$(CH_2)_r$—CH=$CH_2$ wherein r is 0 to 6. Groups $R^5$ may be different while at least two $R^5$ should be alkenyl. The subscripts n, m, p and q are such positive numbers that the organopolysiloxane may have a viscosity of 10 to 1,000,000 mPa-s at 25° C., and 0≤q≤10. It is noted that the viscosity is measured by a B-type rotational viscometer.

In the composition, the alkenyl-containing organopolysiloxane is a base component, and its amount is 100 parts by weight.

Component (C) is an addition reaction catalyst, i.e., a catalyst capable of promoting addition reaction, typically a platinum group metal complex. Any of the platinum group metal complexes well known to catalyze addition reaction may be used. Suitable platinum group metal catalysts include platinum, palladium, rhodium and ruthenium base compounds, with the platinum base compounds being preferred. Examples of the platinum base catalyst include chloroplatinic acid, solutions of chloroplatinic acid in alcohols or aldehydes, and complexes of chloroplatinic acid with olefins or vinylsiloxanes. The platinum group metal catalyst is added in a catalytic amount. It is preferred for economy to use the catalyst in an amount of 5 to 1,000 ppm, more preferably 50 to 200 ppm of platinum group metal based on the total weight of organopolysiloxanes (A) and (B).

The addition-cure silicone composition may be prepared by compounding amounts of components (A) to (C) and one or more optional components. The optional component(s) may be used in a conventional amount as long as the objects of the invention are not impaired. For example, (D) a reaction regulator may be compounded for controlling the catalytic activity of the platinum group metal catalyst. Examples of the reaction regulator include organic nitrogen compounds, organic phosphorus compounds, acetylene compounds, oxime compounds, and organic chlorinated compounds.

Any of well-known reaction regulators may be used. Examples include acetylene alcohols such as 1-ethynyl-1-cyclohexanol, 3-methyl-1-butyn-3-ol, 3,5-dimethyl-1-hexyn-3-ol, 3-methyl-1-penten-3-ol, and phenylbutynol, reaction products of these acetylene compounds with alkoxysilanes or siloxanes or hydrogen-silanes or siloxanes, vinylsiloxanes such as tetramethylvinylsiloxane cyclics, and organic nitrogen compounds such as benzotriazole, as well as organic phosphorus compounds, oxime compounds.

The reaction regulator (D) may be used in a suitable amount to provide stability of the composition, preferably 0.01 to 10% by weight, more preferably 0.05 to 5% by weight based on the total weight of components (A) to (C).

Other components which can be optionally added to the silicone composition include diluent solvents, stabilizers, heat resistance improvers, fillers, pigments, leveling agents, adhesion promoters, antistatic agents, antifoaming agents, and non-reactive organopolysiloxanes.

The addition-cure silicone composition is coated onto a substrate and cured to form a cured sheet thereon. Examples of the substrate include paper substrates such as glassine paper, kraft paper and clay-coated paper, laminated paper such as polyethylene-laminated wood-free paper and polyethylene-laminated kraft paper, plastic films or sheets of synthetic resins such as polyester, polypropylene, polyethylene, polyvinyl chloride, polytetrafluoroethylene, and polyimide, metal foils such as aluminum.

In applying the silicone composition to the substrate, any of well-known coating techniques including roll coating, gravure coating, wire doctor coating, air knife coating, and dipping may be used. The coating may have a weight or coverage of 0.01 to 1,000 g/m² and a thickness of 0.01 to 1,000 µm. The composition may be applied to the entire surface of the substrate or partially to a necessary surface area thereof. The silicone composition may be cured preferably by heating at 50 to 200° C. for 1 second to 10 minutes.

EXAMPLE

Examples of the invention are given below by way of illustration and not by way of limitation. All parts are by weight. Me stands for methyl. In Examples, the physical properties reported in Table 1 are determined by the following tests.

Cure

A silicone composition immediately after its preparation was coated onto a polyethylene-laminated paper sheet to a coating weight of 1.0 g/m² and heated in a hot air dryer at 120° C. for a certain time. The cured sheet was rubbed several strokes with the finger and visually judged for haze and peel-off. The time (sec) taken for curing is an index of cure.

Adhesion

A silicone composition immediately after its preparation was coated onto a polyethylene-laminated paper sheet to a coating weight of 1.0 g/m² and heated in a hot air dryer at 120° C. for 30 seconds. The cured sheet was kept for one day at room temperature before it was rubbed several strokes with the finger and visually judged for haze and peel-off. The test result indicates initial adhesion. Separately the cured sheet was kept for 7 days in a thermostatic chamber at a temperature of 40° C. and a humidity of 90% before it was rubbed several strokes with the finger and visually judged for haze and peel-off. The test result indicates aged adhesion.

Peeling Force

A silicone composition immediately after its preparation was coated onto a polyethylene-laminated paper sheet to a coating weight of 1.0 g/m² and heated in a hot air dryer at 120° C. for 30 seconds. The cured sheet was kept for one day at room temperature. Thereafter, acrylic pressure-sensitive adhesive BPS-5127 (Toyo Ink Co., Ltd.) was coated onto the cured sheet and heat treated at 100° C. for 3 minutes. Another 64 g/m² fine paper sheet was attached to the adhesive-coated surface. The assembly was cut into a strip sample of 5 cm wide. The sample was aged at room temperature for one day. Using a tensile tester, the fine paper sheet was peeled from the sample at an angle of 180° and a pulling rate of 0.3 m/min. The force required for peeling was measured and reported as peeling force.

Residual Adhesion

A silicone composition immediately after its preparation was coated onto a polyethylene-laminated paper sheet to a coating weight of 1.0 g/m² and heated in a hot air dryer at 120° C. for 30 seconds. The cured sheet was kept for one day at room temperature. A polyester tape (Nitto 31B, by Nitto Denko Corp.) was attached to the cured sheet (silicone liner), and the assembly was heat treated at 70° C. for 20 hours under a load of 1,976 Pa. The polyester tape was peeled off, and the polyester tape was attached to a stainless steel plate. Using a tensile tester, the tape was peeled from the steel plate. The force required for peeling was similarly measured and designated as bond strength (A).

Likewise, a polyester tape (Nitto 31B) was attached to a Teflon® sheet, and the assembly was heat treated at 70° C. for 20 hours under a load of 1,976 Pa. The polyester tape was peeled off, and the tape was attached to a stainless steel plate. Using a tensile tester, the tape was peeled from the steel plate. The force required for peeling was similarly measured and designated as bond strength (B) of a blank not in contact with the cured silicone surface. A percent residual adhesion was calculated according to the equation.

residual adhesion=(bond strength $A$)/(blank bond strength $B$)×100

Example 1

Synthesis of Organohydrogenpolysiloxane #1

In a four-necked flask equipped with a stirrer, thermometer, reflux condenser and dropping funnel, 186 parts of a siloxane monomer 1 having the formula (12), 100 parts of toluene as a solvent, and 0.5 part of a platinum catalyst toluene solution having a Pt content of 0.5 wt % were mixed and heated at 65° C. Then 326 parts of a siloxane monomer 2 having the formula (13) was added in divided portions. After the completion of addition, reaction run at 70° C. for 3 hours. Active carbon, 3.0 parts, was added to the reaction solution, which was stirred for 8 hours at room temperature. After the active carbon was filtered off, the reaction solution was distilled at 90° C. and 30 mmHg for removing the toluene and volatile matter, yielding 437 parts of a siloxane oligomer #1.

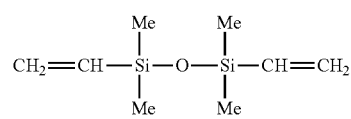

(12)

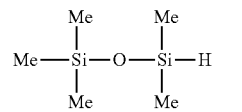

(13)

Next, a four-necked flask equipped with a stirrer, thermometer, reflux condenser and dropping funnel was charged with 56 parts of siloxane oligomer #1 and 103 parts of 1,3,5,7-tetramethylcyclotetrasiloxane. With stirring, 0.1 part of trifluoromethanesulfonic acid was added. Stirring was continued for 10 hours at room temperature. Thereafter, 0.9 part of adsorbent Kyoward 500SH (Kyowa Chemical Industry Co., Ltd.) was added, stirring was continued for 4 hours at room temperature, and the adsorbent was filtered off. The reaction solution was distilled at 120° C. and 20 mmHg for removing the unreacted reactants, yielding 135 parts of an organohydrogenpolysiloxane #1. It was a pale yellow transparent liquid having a viscosity of 22 mm²/s and a hydrogen gas release of 245 mL/g. On NMR analysis, organohydrogenpolysiloxane #1 was identified to be a polymer having the following structural formula (14).

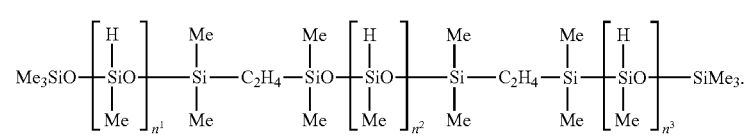

(14)

$(n^1 + n^2 + n^3 ≒ 15)$

Example 2

Synthesis of Organohydrogenpolysiloxane #2

In a four-necked flask equipped with a stirrer, thermometer, reflux condenser and dropping funnel, 82 parts of 1,5-hexadiene, 100 parts of toluene as a solvent, and 0.5 part of a platinum catalyst toluene solution having a Pt content of 0.5 wt % were mixed and heated at 65° C. Then 326 parts of siloxane monomer 2 having formula (13) was added in divided portions. After the completion of addition, reaction run at 70° C. for 3 hours. Active carbon, 3.0 parts, was added to the reaction solution, which was stirred for 8 hours at room temperature. After the active carbon was filtered off, the reaction solution was distilled at 90° C. and 30 mmHg for removing the toluene and volatile matter, yielding 302 parts of a siloxane oligomer #2.

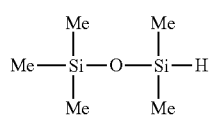

(13)

Next, a four-necked flask equipped with a stirrer, thermometer, reflux condenser and dropping funnel was charged with 56 parts of siloxane oligomer #2 and 103 parts of 1,3,5,7-tetramethylcyclotetrasiloxane. With stirring, 0.1 part of trifluoromethanesulfonic acid was added. Stirring was continued for 10 hours at room temperature. Thereafter, 0.9 part of adsorbent Kyoward 500SH was added, stirring was continued for 4 hours at room temperature, and the adsorbent was filtered off. The reaction solution was distilled at 120° C. and 20 mmHg for removing the unreacted reactants, yielding 132 parts of an organohydrogenpolysiloxane #2. It was a pale yellow transparent liquid having a viscosity of 21 mm²/s and a hydrogen gas release of 248 mL/g. On NMR analysis, organohydrogenpolysiloxane #2 was identified to be a polymer having the following structural formula (15).

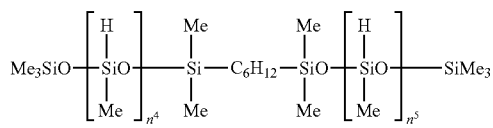

(15)

$(n^4 + n^5 \fallingdotseq 12)$

Example 3

Synthesis of Organohydrogenpolysiloxane #3

In a four-necked flask equipped with a stirrer, thermometer, reflux condenser and dropping funnel, 186 parts of a siloxane monomer 3 having the formula (16), 100 parts of toluene as a solvent, and 0.8 part of a platinum catalyst toluene solution having a Pt content of 0.5 wt % were mixed and heated at 65° C. Then 444 parts of a siloxane monomer 4 having the formula (17) was added in divided portions. After the completion of addition, reaction run at 100-120° C. for 10 hours. Active carbon, 3.0 parts, was added to the reaction solution, which was stirred for 8 hours at room temperature. After the active carbon was filtered off, the reaction solution was distilled at 110° C. and 30 mmHg for removing the toluene and volatile matter, yielding 540 parts of a siloxane oligomer #3.

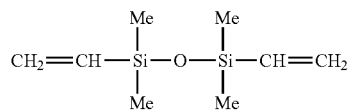

(16)

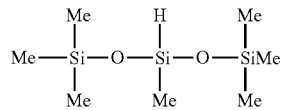

(17)

Next, a four-necked flask equipped with a stirrer, thermometer, reflux condenser and dropping funnel was charged with 56 parts of siloxane oligomer #3 and 103 parts of 1,3,5,7-tetramethylcyclotetrasiloxane. With stirring, 0.1 part of trifluoromethanesulfonic acid was added. Stirring was continued for 10 hours at room temperature. Thereafter, 0.9 part of adsorbent Kyoward 500SH was added, stirring was continued for 4 hours at room temperature, and the adsorbent was filtered off. The reaction solution was distilled at 120° C. and 20 mmHg for removing the unreacted reactants, yielding 130 parts of an organohydrogenpolysiloxane #3. It was a pale yellow transparent liquid having a viscosity of 33 mm²/s and a hydrogen gas release of 255 mL/g. On NMR analysis, organohydrogenpolysiloxane #3 was identified to be a polymer having the following structural formula (18).

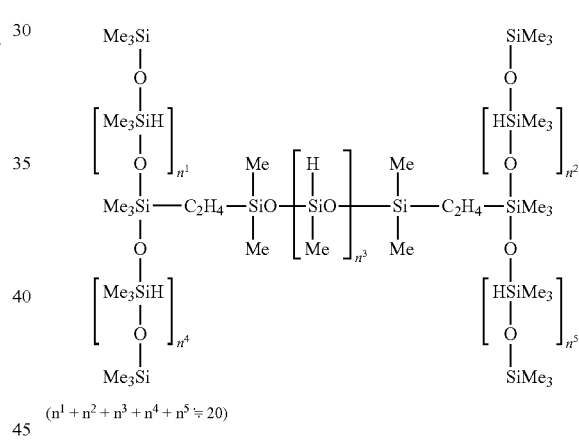

(18)

$(n^1 + n^2 + n^3 + n^4 + n^5 \fallingdotseq 20)$

Example 4

Preparation of Addition-Cure Silicone Composition

A silicone mixture #1 was prepared by intimately mixing 3.4 parts of organohydrogenpolysiloxane #1 in Example 1 as component (A) with 100 parts of an alkenyl-containing organopolysiloxane #1 having a viscosity of 400 mPa-s at 25° C. and an alkenyl content of 0.02 mol/100 g, represented by formula (19), as component (B), and 0.2 part of ethynylcyclohexanol.

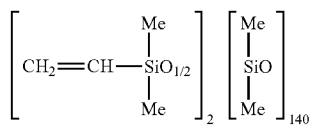

(19)

To 100 parts of silicone mixture #1, 2 parts (100 ppm of Pt) of a chloroplatinic acid-vinylsiloxane complex salt was added, followed by thorough mixing into a silicone composition #1. This silicone composition #1 was examined for cure, adhesion, peeling force, and residual adhesion by the foregoing tests, with the results shown in Table 1.

Example 5

Preparation of Addition-Cure Silicone Composition

A silicone mixture #2 was prepared by intimately mixing 3.4 parts of organohydrogenpolysiloxane #2 in Example 2 with 100 parts of alkenyl-containing organopolysiloxane #1 (used in Example 4) and 0.2 part of ethynylcyclohexanol. To 100 parts of silicone mixture #2, 2 parts (100 ppm of Pt) of a chloroplatinic acid-vinylsiloxane complex salt was added, followed by thorough mixing into a silicone composition #2. This silicone composition #2 was examined for cure, adhesion, peeling force, and residual adhesion by the foregoing tests, with the results shown in Table 1.

Example 6

Preparation of Addition-Cure Silicone Composition

A silicone mixture #3 was prepared by intimately mixing 3.4 parts of organohydrogenpolysiloxane #3 in Example 3 with 100 parts of alkenyl-containing organopolysiloxane #1 (used in Example 4) and 0.2 part of ethynylcyclohexanol. To 100 parts of silicone mixture #3, 2 parts (100 ppm of Pt) of a chloroplatinic acid-vinylsiloxane complex salt was added, followed by thorough mixing into a silicone composition #3. This silicone composition #3 was examined for cure, adhesion, peeling force, and residual adhesion by the foregoing tests, with the results shown in Table 1.

Comparative Example 1

A silicone mixture #4 was prepared by intimately mixing 2.1 parts of an organohydrogenpolysiloxane having a hydrogen gas release of 340 mL/g, represented by the formula (20), with 100 parts of alkenyl-containing organopolysiloxane #1 (used in Example 4) and 0.2 part of ethynylcyclohexanol. To 100 parts of silicone mixture #4, 2 parts (100 ppm of Pt) of a chloroplatinic acid-vinylsiloxane complex salt was added, followed by thorough mixing into a silicone composition #4. This silicone composition #4 was examined for cure, adhesion, peeling force, and residual adhesion by the foregoing tests, with the results shown in Table 1.

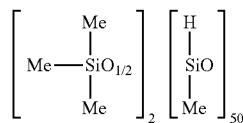

(20)

Comparative Example 2

A silicone mixture #5 was prepared by intimately mixing 3.4 parts of an organohydrogenpolysiloxane having a hydrogen gas release of 252 mL/g, represented by the formula (21), with 100 parts of alkenyl-containing organopolysiloxane #1 (used in Example 4) and 0.2 part of ethynylcyclohexanol. To 100 parts of silicone mixture #5, 2 parts (100 ppm of Pt) of a chloroplatinic acid-vinylsiloxane complex salt was added, followed by thorough mixing into a silicone composition #5. This silicone composition #5 was examined for cure, adhesion, peeling force, and residual adhesion by the foregoing tests, with the results shown in Table 1.

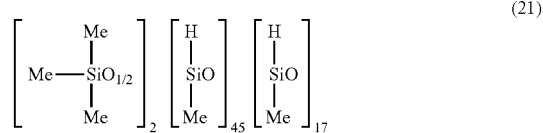

(21)

TABLE 1

|  | Cure (sec) | Adhesion Initial | Adhesion Aged | Peeling force (N/50 mm) | Residual adhesion (%) |
| --- | --- | --- | --- | --- | --- |
| Example 4 | 10 | good | good | 0.48 | 98 |
| Example 5 | 10 | good | good | 0.42 | 99 |
| Example 6 | 10 | good | good | 0.41 | 97 |
| Comparative Example 1 | 20 | good | good | 0.43 | 100 |
| Comparative Example 2 | 7 | good | peeled | 0.58 | 94 |

Japanese Patent Application Nos. 2009-168785 and 2009-168793 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A linear or branched organohydrogenpolysiloxane comprising recurring structural units of the formula (2):

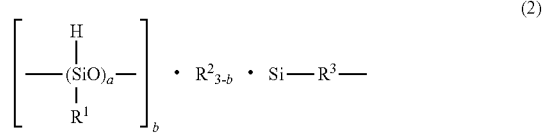

(2)

wherein $R^1$ is a substituted or unsubstituted monovalent hydrocarbon group of 1 to 10 carbon atoms, a is an integer of at least 2, $R^2$ is a substituted or unsubstituted monovalent hydrocarbon group of 1 to 10 carbon atoms, b is 1, 2, or 3, and $R^3$ is a substituted or unsubstituted divalent hydrocarbon group of at least 2 carbon atoms, wherein said linear or branched organohydrogenpolysiloxane is terminated with an $(R^2)_3SiO$- and/or an $H(R^2)_2SiO$-group.

2. The organohydrogenpolysiloxane of claim 1 wherein, in formula (2), $R^3$ is a straight or branched alkylene group of 2 to 10 carbon atoms.

3. The organohydrogenpolysiloxane of claim 1, wherein $R^1$ is alkyl or aryl.

4. The organohydrogenpolysiloxane of claim 1, wherein a is an integer of from 3 to 30.

5. The organohydrogenpolysiloxane of claim 1, wherein $R^2$ is alkyl, cycloalkyl, or aryl.

6. The organohydrogenpolysiloxane of claim 1, which is a polymer of formula (14)
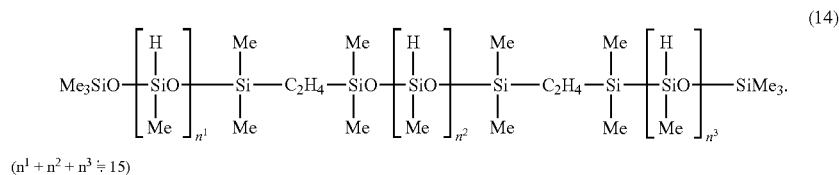
(14)
$(n^1 + n^2 + n^3 \fallingdotseq 15)$
7. The organohydrogenpolysiloxane of claim 1, which is a polymer of formula (15)
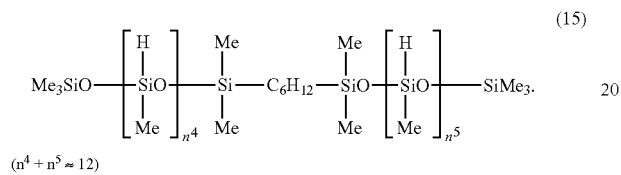
(15)
$(n^4 + n^5 \approx 12)$
8. The organohydrogenpolysiloxane of claim 1, which is a polymer of formula (18)
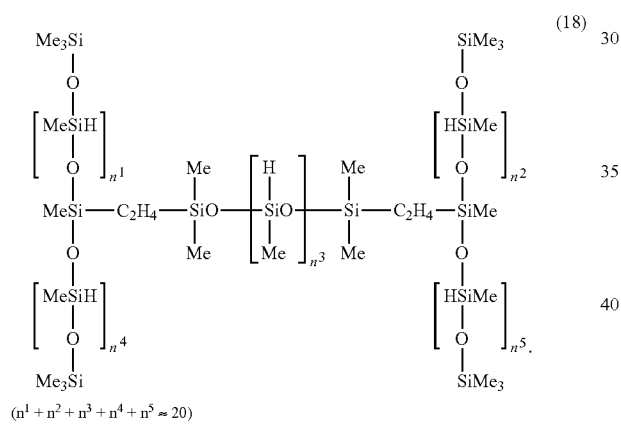
(18)
$(n^1 + n^2 + n^3 + n^4 + n^5 \approx 20)$
* * * * *